S. A. ELLIS.
APPARATUS FOR TEACHING BOOKKEEPING.
APPLICATION FILED FEB. 12, 1917.

1,234,743.

Patented July 31, 1917.

Inventor
STEPHEN A. ELLIS.

By _____
Attorney

UNITED STATES PATENT OFFICE.

STEPHEN A. ELLIS, OF BIRMINGHAM, ALABAMA.

APPARATUS FOR TEACHING BOOKKEEPING.

1,234,743.	Specification of Letters Patent.	Patented July 31, 1917.

Application filed February 12, 1917. Serial No. 148,176.

*To all whom it may concern:*

Be it known that I, STEPHEN A. ELLIS, a citizen of the United States of America, residing at Birmingham, in the county of Jefferson and State of Alabama, have invented certain new and useful Improvements in Apparatus for Teaching Bookkeeping, of which the following is a specification.

My apparatus relates to a novel and effective apparatus which I have successfully employed in the teaching of double entry book-keeping.

My object is to provide an apparatus of such character that the student has before him a chart which presents to the whole class the various accounts which are customarily used in connection with keeping double entry books of account, and each account is adapted to receive and display an entry not permanent in its nature for indicating the application of a "Dr" and "Cr" in the several accounts necessary to properly record a transaction. The temporary entries may be made by cards or tickets or by chalk marks where the chart is on a blackboard and as each problem is presented it is solved by an application of one or more debits to the appropriate accounts and by corresponding credits to the other appropriate accounts, thereby offering to the student a training which in a remarkably short time enables him to quickly and automatically distribute the debits and credits with a facility which I have found it impossible to obtain from the old methods of instruction, except after many months of patient and careful study.

I have illustrated my invention in Figure 1, which shows in perspective elevation what I regard as the preferred embodiment of my invention.

Fig. 2 is a fragmental view of a blackboard embodying the principles of my invention.

It will be understood that the mechanical details may be varied without departing from the principles underlying my invention.

In the preferred embodiment of the apparatus, I employ a chart 1 adapted to be hung or mounted on the wall and which is long enough to display a sufficient number of subdivisions representing different classes of accounts to cover the ordinary requirements of double entry book-keeping and will so display the designating indicia of the accounts that the same may be visible from all parts of the school room. The chart which I have employed is about six feet in length and has a casing 2 of cardboard which is ruled with a top horizontal line, above which appears the word "Ledger." Below this the chart is ruled into fifteen vertical columns which are successively from left to right headed by the following indicia, namely:— "Cash," "C. Inv." for capital invested, "Mdse." for merchandise, "B R" for bills receivable, "B P" for bills payable, "Ex." for expense, "L & G" for loss and gain, "F & F" for furniture and fixtures, "H & D" for horse and dray, "Int." for interest, "Coal," "R E" for real estate, "S & B" for stock and bonds, and the two final columns representing individual accounts are headed by the proper names "Ray" and "Cox." These several headings are arranged in a horizontal top column intersecting the vertical columns and defined by the horizontal lines 3 and 4, and above the line 3 and between it and the top horizontal line 5, is an upper horizontal column containing the numerals from 1 to 14 consecutively displayed in the vertical columns, excepting the cash column, as read from left to right to indicate the different numbering of ledger pages subdivided by a middle vertical line 6 into two subcolumns, the left hand column of each pair of subcolumns being designated "Dr." for debit and the right hand subcolumn of each pair being designated "Cr." for credit. By this arrangement each main vertical column corresponds to a page carrying the debits and credits of one of the various accounts necessary for book-keeping operations.

I provide a number of cards 7 having displayed on one side thereof the indicia "Cr." and on the opposite side thereof the indicia "Dr.," and I provide in each main vertical column a means whereby the student can affix the card in order to indicate thereby a debit or credit entry as the case may be in that particular account. As a very simple means to this end I provide in the center of each main vertical column a pin or hook 8 and provide each card with a perforation 9 by which it can be hung over the hook. In the form illustrated we find the cards applied to the chart so as to indicate a credit to merchandise account and a debit to the individual account of Ray.

In operation, the chart is displayed to the class and the instruction is given by announcing transactions and requiring the students as each transaction is announced to apply the cards to the chart so as to indicate the distribution of the transaction by its proper debit and credit entries in the proper accounts. By the use of this apparatus I am enabled to instruct the individual and at the same time to instruct the whole class and I have obtained proficiency from students within a training period representing but a small fraction of the time heretofore found necessary under the former methods of instruction to produce an equal degree of efficiency.

While I have illustrated the apparatus for use with cards, I may use as a modification thereof a blackboard 10 bearing the same markings and indicia as the chart 1 and in which the students are required to make the temporary debit and credit entries by chalk marks in the appropriate columns.

Having thus described my invention, what I claim as new and desire to secure by Letters Patent, is:—

1. An apparatus for instruction in book-keeping comprising a chart subdivided into columns respectively headed by indicia indicating different accounts incident to double entry book-keeping, each account column being adapted to receive a removable non-permanent debit or credit entry, substantially as described.

2. An apparatus for instruction in book-keeping comprising a chart subdivided by vertical columns into spaces appropriately headed to designate different book-keeping accounts, and cards marked debit and credit, and means to detachably mount said cards in display position opposite said spaces, substantially as described.

3. An apparatus for instruction in book-keeping comprising a chart subdivided by vertical spaces into main columns and subdivided by horizontal lines into a heading column for said main columns, said heading columns bearing indicia opposite each main vertical column to indicate cash, merchandise and other similar accounts incident to double entry book-keeping, and means for the display of a readily removable debit or credit symbol in any of the main vertical columns desired, substantially as described.

In testimony whereof I affix my signature.

STEPHEN A. ELLIS.

Witness:
Nomie Welsh.

Copies of this patent may be obtained for five cents each, by addressing the "Commissioner of Patents, Washington, D. C."